US011429625B2

United States Patent
Costantino et al.

(10) Patent No.: US 11,429,625 B2
(45) Date of Patent: *Aug. 30, 2022

(54) QUERY ENGINE FOR REMOTE ENDPOINT INFORMATION RETRIEVAL

(71) Applicant: Musarubra US LLC, Plano, TX (US)

(72) Inventors: Leandro Ignacio Costantino, Cabalango (AR); Cristian A. Sanchez, Cordoba (AR); Juan M. Olle, Cordoba (AR); Diego Naza Pamio, Cordoba (AR)

(73) Assignee: Musarubra US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,547

(22) Filed: Mar. 9, 2020

(65) Prior Publication Data

US 2020/0210424 A1  Jul. 2, 2020

Related U.S. Application Data

(63) Continuation of application No. 14/751,560, filed on Jun. 26, 2015, now Pat. No. 10,599,662.

(51) Int. Cl.
*G06F 16/2458* (2019.01)
*G06F 16/245* (2019.01)

(52) U.S. Cl.
CPC ........ *G06F 16/2471* (2019.01); *G06F 16/245* (2019.01)

(58) Field of Classification Search
CPC ........................... G06F 16/245; G06F 16/2471
See application file for complete search history.

(56) References Cited

U.S. PATENT DOCUMENTS

| 5,987,610 | A  | 11/1999 | Franczek et al. |
| 6,006,224 | A  | 12/1999 | McComb et al. |
| 6,073,142 | A  |  6/2000 | Geiger et al. |
| 6,256,664 | B1 |  7/2001 | Donoho et al. |
| 6,263,362 | B1 |  7/2001 | Donoho et al. |
| 6,356,936 | B1 |  3/2002 | Donoho et al. |
| 6,453,356 | B1 |  9/2002 | Sheard et al. |

(Continued)

OTHER PUBLICATIONS

CN Nov. 15, 2021 Second Office Action from corresponding Chinese Application No. 201680036822.2 [with English translation].

(Continued)

*Primary Examiner* — Azizul Choudhury
(74) *Attorney, Agent, or Firm* — Patent Capital Group

(57) ABSTRACT

Embodiments are disclosed herein for remote retrieval of information from endpoints and comprise receiving a master query at an endpoint in a network environment and executing a set of one or more subqueries defined in the master query. Embodiments also comprise an execution of a first subquery that includes executing a function to produce a first output, applying one or more conditions to the first output to determine a second output, and determining a result of the master query based, at least in part, on the second output. In specific embodiments, the master query is received from another node over a network connection. In more specific embodiments, the function is executed on the endpoint to collect real-time information based on one or more parameters. In further embodiments, the function is one of a plug-in or a script.

20 Claims, 11 Drawing Sheets

(56) References Cited

U.S. PATENT DOCUMENTS

| | | | |
|---|---|---|---|
| 6,460,050 | B1 | 10/2002 | Pace et al. |
| 6,581,055 | B1* | 6/2003 | Ziauddin ............ G06F 16/24547 |
| 9,946,756 | B2* | 4/2018 | Hsiao ................ G06F 16/24539 |
| 2001/0005883 | A1 | 6/2001 | Wray et al. |
| 2003/0188189 | A1 | 10/2003 | Desai et al. |
| 2004/0015728 | A1 | 1/2004 | Cole et al. |
| 2006/0010487 | A1 | 1/2006 | Fierer et al. |
| 2006/0085391 | A1* | 4/2006 | Turski ................... G06F 16/907 |
| 2007/0168452 | A1 | 7/2007 | Winter |
| 2007/0180493 | A1 | 8/2007 | Croft et al. |
| 2008/0147627 | A1 | 6/2008 | Natkovich et al. |
| 2008/0148350 | A1 | 6/2008 | Hawkins et al. |
| 2008/0307530 | A1 | 12/2008 | Lee et al. |
| 2009/0164522 | A1 | 6/2009 | Fahey |
| 2009/0228434 | A1* | 9/2009 | Krishnamurthy ............................ G06F 16/24568 |
| 2009/0271385 | A1 | 10/2009 | Krishnamoorthy et al. |
| 2009/0276667 | A1 | 11/2009 | Dopson et al. |
| 2010/0169351 | A1 | 7/2010 | Kulkarni et al. |
| 2010/0318846 | A1 | 12/2010 | Sailer et al. |
| 2010/0332640 | A1 | 12/2010 | Goodrow et al. |
| 2011/0066841 | A1 | 3/2011 | Goodrow et al. |
| 2011/0154255 | A1 | 6/2011 | Ryu et al. |
| 2012/0143896 | A1 | 6/2012 | Gatter |
| 2014/0172867 | A1 | 6/2014 | Lin et al. |
| 2014/0181247 | A1 | 6/2014 | Hindawi et al. |
| 2014/0222858 | A1* | 8/2014 | Leonard ............... H04L 63/0823 707/769 |
| 2014/0223513 | A1 | 8/2014 | Islam et al. |
| 2015/0074750 | A1 | 3/2015 | Pearcy et al. |
| 2015/0149624 | A1 | 5/2015 | Hindawi et al. |
| 2015/0163132 | A1 | 6/2015 | Hindawi et al. |
| 2016/0182566 | A1 | 6/2016 | Bean et al. |
| 2016/0381121 | A1 | 12/2016 | Costantino et al. |
| 2018/0316708 | A1* | 11/2018 | Strong .................... H04L 63/20 |

OTHER PUBLICATIONS

CN dated Apr. 21, 2022 Third Office Action from Chinese Application No. 201680036822.2 [with Machine translation].

* cited by examiner

```
                                              400
    {                                          ↙
      "id": "XXXX",  ─402
404 ─ "queries": [
        {
    ┌     "op": "all",
406 ┤     "q": [
    └       {
              "platform": "windows",
              "module": "FileSystem",
              "function": "search",
              "args": {
                  "dir": "c: \\",
408 ┤           "name": "*.pepe",
                  "content": "malware"
              },
              "primary": true,
              "condition_op": "and",
              "condition": [{ "condition_op": "or", "cc":[{
                  "target": "$result.files",
                  "function": "",
    ┌             "op": "gt",
410 ┤             "value": "0",
                  "valueType": "NUMBER",
    └             "boolean": false}]}],
              "output": {
                  "name": "fileoutput",
412 ┤           "target": "$result.files",
                  "fields": [
                      "name"
                  ]
              }
            }
          ]
        }
      ],
414 ─ "responses": [
        {
416 ┤   "op": "and",
        "q": [.... same as queries...]
        }
      ],
418 ─ "triggers": [
        {
420 ┤   "op": "and",
        "q": [.... same as queries... ]
```

FIG. 4

QUERY ENGINE FOR REMOTE ENDPOINT INFORMATION RETRIEVAL

CROSS-REFERENCE TO RELATED APPLICATION

This is a continuation application of U.S. patent application Ser. No. 14/751,560 filed Jun. 26, 2015, and entitled "QUERY ENGINE FOR REMOTE ENDPOINT INFORMATION RETRIEVAL," which is hereby incorporated by reference herein in its entirety.

TECHNICAL FIELD

This disclosure relates in general to the field of computer security, and more particularly, to a query engine for remote endpoint information retrieval in a network environment.

BACKGROUND

The field of computer security has become increasingly important in today's society. The Internet has enabled interconnection of different computer networks all over the world. This interconnection capability has presented many opportunities for malicious operators to exploit these networks and infect endpoints of network environments with malicious software (also referred to herein as 'malware'). Malware can be configured to perform any number of malicious actions on an endpoint including, but not limited to, sending out spam or malicious emails from an endpoint, stealing sensitive information from a business or individual associated with the endpoint, propagating to other endpoints, assisting with distributed denial of service attacks, and/or targeting certain regions of a storage disk in order to gain unauthorized control of an endpoint and its resources.

In addition to outsider threats, endpoints in a network environment can also be subjected to insider threats. Authorized individuals, for example, may intentionally or unintentionally cause harm within a network environment. Examples include, but are not limited to, using an endpoint to perform unauthorized activities such as copying, transmitting, or otherwise accessing sensitive data. Additionally, some network environments (e.g., large enterprise networks) may contain many thousands of endpoints, which can significantly increase the risk of at least some endpoints being compromised. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is an example master query using the example query language in the communication system according to at least one embodiment;

DETAILED DESCRIPTION OF EMBODIMENTS

Figure 1:
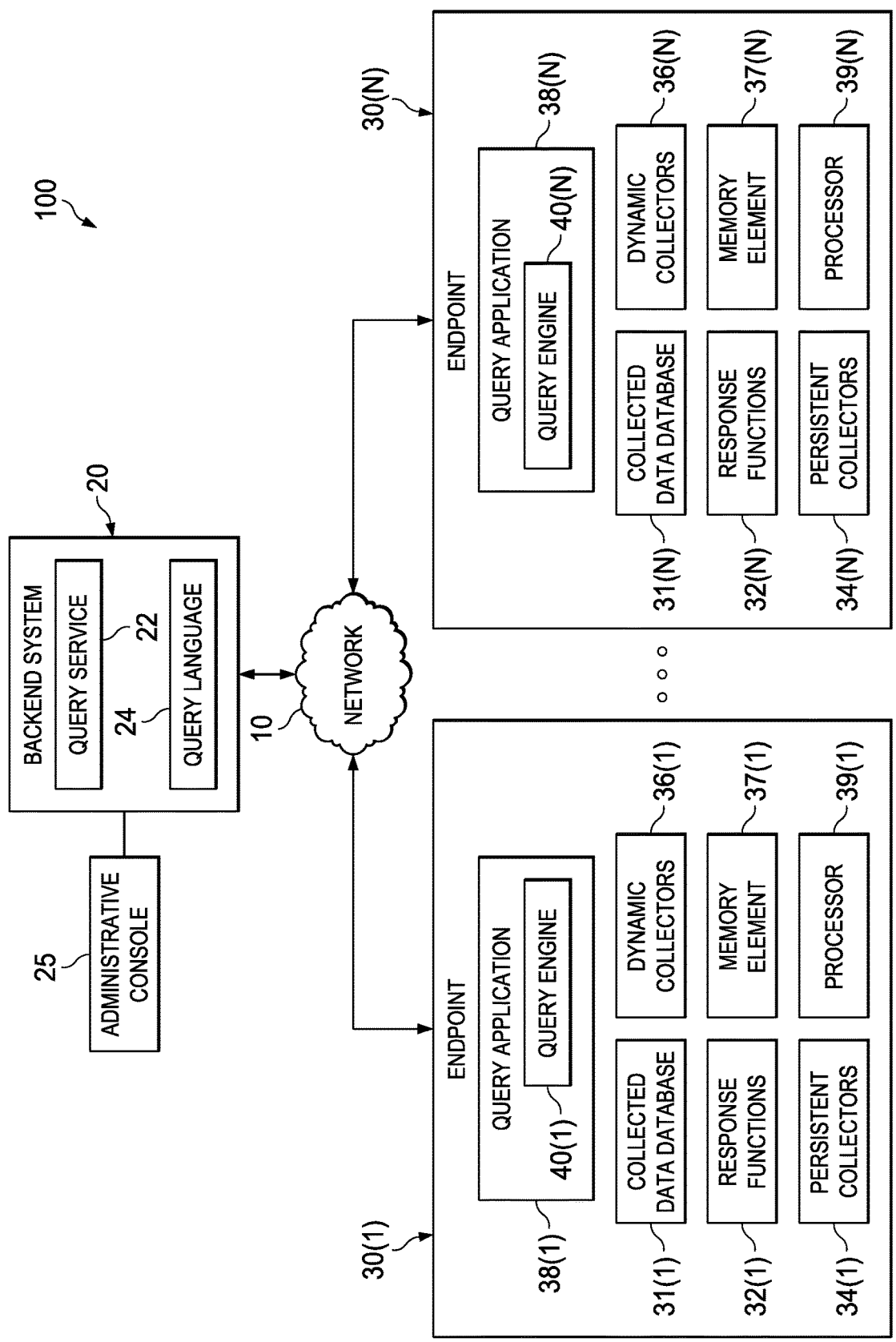
FIG. 1 is a simplified block diagram of a communication system for remote information retrieval from an endpoint according to at least one embodiment of the present disclosure.

FIG. 1 is a simplified block diagram of an example communication system 100 for remote information retrieval from an endpoint. Communication system 100 includes a backend system 20, a network 10 and endpoints 30(1)-30(N). Backend system 20 may be configured with a query service 22, a query language 24, and an administrative console 25. Network 10 enables communication between backend system 20 and endpoints 30(1)-30(N). Endpoints 30(1)-30(N) can include, respectively, collected data databases 31(1)-31(N), response functions 32(1)-32(N), persistent collectors 34(1)-34(N), dynamic collectors 36(1)-36(N), and query applications 38(1)-38(N). Endpoints 30(1)-30(N) may also include other components such as memory elements 37(1)-37(N), processors 39(1)-39(N), network interface cards (not shown), and any other hardware (or software) to facilitate the operations thereof. Query applications 38(1)-38(N) can include respective query engines 40(1)-40(N). Query engines may be locally provisioned in respective endpoints to receive and process master queries to search information, trap information, and/or respond to events or retrieved information on endpoints 30(1)-30(N).

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

For purposes of illustrating certain example techniques of a communication system for remote information retrieval from an endpoint, it is important to understand the activities that may be occurring in the network environment. The following foundational information may be viewed as a basis from which the present disclosure may be properly explained.

Enterprise networks, among others, often store electronic data that is critical to their operations. In addition, confidential or sensitive data of an entity, its employees, and/or its clients or customers is often stored in such networks and may be subject to state and federal privacy laws. Such data may be stored in or accessible via endpoints in the network. Endpoints in a network, such as an enterprise network for example, can include any number of computing systems, mobile devices, and network elements. Examples of endpoints can include, but are not limited to, desktop computers, laptops, notebooks, servers, automated teller machines (ATMs), tablets, mobile phones, Internet of Things (IoTs) devices, and smart appliances.

Oftentimes, enterprise networks are targeted by malware due to the potential for broad public notoriety and/or access to the sensitive or confidential information that is stored in these networks. In addition, endpoints in a network are often at risk from intentional and unintentional misuse by authorized users who have permission to access critical operational data and other confidential or sensitive data related to the entity, its clients, and/or its employees.

Malware attacks have become more and more sophisticated in recent years. In some scenarios, malware is capable of circumventing traditional antivirus solutions such as signature-based whitelisting and blacklisting techniques. In particular, advanced persistent threats and customized targeted malware have made it increasingly difficult to detect and mitigate threats and malware on endpoints. Thus, many systems have a need for continuous protection against newer types of malware such as advanced persistent threats, in addition to internal sabotage and/or error.

Endpoint detection and response (EDR) is an emerging technology that focuses on detecting and evaluating suspicious activities on hosts and other types of endpoints. Typically, such systems store information in structured manners in a central location to process the information. These systems may have limited functionality, however, including a limited ability to filter information with new value types. Moreover, such systems generally do not include an ability to join information or prepare data to be reduced by external systems. Thus, receiving complex queries for information on an endpoint, where such queries can dynamically gather and process the information is generally not possible. Consequently, a need still exists to enable retrieval of real-time data from each endpoint in a particular network, while reducing network bandwidth and processing time of unstructured and dynamic results.

Embodiments of a communication system, as described herein, can resolve the aforementioned issues (and more) by providing a query language and a query engine that is capable of processing queries (based on the query language) on an endpoint. Complex queries can be remotely crafted by an administrator and executed by a query engine on an endpoint to search for desired data, to retrieve or collect desired data, to trigger responses (or actions) based on one or more conditions applied to information from events or functions, and to execute a desired response on the endpoint. These complex queries can include executing functions, applying provided conditions, filtering output, and returning results from the endpoint. Functions that are executed can return information that can be analyzed by the query engine on the endpoint. Information from a function (e.g., a plug-in) can be analyzed based on one or more conditions and a determination can be made as to the success or failure of a specific query or subquery. Also, a trigger can enable entry points to be created that proactively act on specific events or react to specific events on an endpoint, even when the endpoint is offline. Additionally, a query engine can also be run as a standalone server to serve requests for other types of processing such as, for example, analyzing Internet activities initiated on the endpoint.

Embodiments disclosed herein provide several advantages. First, embodiments allow processing to be distributed among endpoints in a network, which can reduce the network bandwidth needed to remotely retrieve information from the endpoints. Because data is maintained at the endpoints, the local query engines enable retrieval of endpoint-specific information in addition to execution of dynamic scripts to retrieve new data without having to change the core system. Complex queries can be processed within a single query engine (on an endpoint) to obtain dynamic information associated with the endpoint. Such capabilities enable security and vulnerability analysis of the endpoint. Incident responders (i.e., persons or systems that use the data from queries by query engines) can be provided with updated real-time information from the endpoints based on particular needs and preferences. In some instances, such information may be used to analyze possible existing security breaches or on-going malware attacks. In other instances, such information could be used to investigate past incidents or to proactively react based on various conditions.

Turning to FIG. 1, a brief description is provided about some of the possible infrastructure that may be included in communication system 100. Generally, communication system 100 can include any type or topology of networks, indicated by network 10. Network 10 represents a series of points or nodes of interconnected communication paths for receiving and sending network communications that propagate through communication system 100. Network 110 offers a communicative interface between nodes, and may be configured as any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof.

Network 10 can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., Ethernet, etc.) communication. Generally, any suitable means of communication may be used such as electric, sound, light, infrared, and/or radio (e.g., WiFi, Bluetooth or NFC).

Network traffic (also referred to herein as 'network communications' and 'communications'), can be inclusive of packets, frames, signals, data, objects, etc., and can be sent and received in communication system 100 according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to information, including any type of binary, numeric, voice, video, textual, photographic, or script data, or any type of source or object code, or any other suitable information in any appropriate format that may be communicated from one point to another in computing systems (e.g., endpoints, backend systems, servers, computing devices, etc.) and/or networks. Additionally, messages, requests, responses, replies, etc. can be forms of network traffic.

Backend system 20 represents one or more network elements provisioned in communication system 100 with network access to endpoints 30(1)-30(N). As used herein, the term 'network element' is meant to encompass servers, routers, switches, gateways, bridges, loadbalancers, firewalls, inline service nodes, proxies, processors, modules, SDN controller/switch, or any other suitable device, component, element, or proprietary appliance operable to exchange information in a network environment. This network element may include any suitable hardware, software, firmware, components, modules, interfaces, or objects that facilitate the operations thereof. This may be inclusive of appropriate algorithms and communication protocols that allow for the effective exchange of data or information.

Backend system 20 includes a query service 22 that enables queries to be configured using query language 24 and to be communicated to one or more query engines 40(1)-40(N) of endpoints 30(1)-30(N). In at least one embodiment, administrative console 25 is coupled to backend system to allow an authorized user (e.g., a network administrator, an incident responder) to interact with backend system 20 via a suitable user interface. Administrative console 25 could be a dumb terminal that accesses the processing resources of backend system 20. In other implementations, administrative console 25 could be a computing system with its own processing resources.

An authorized user may configure queries using query language 24, which can be processed by query engines 40(1)-40(N). Query service may format one or more queries configured by the user into a master query having a format capable of being parsed and processed by endpoints 30(1)-30(N). In at least one embodiment, query language 24 can be based on JavaScript Object Notation (JSON).

Endpoints 30(1)-30(N) are intended to represent any type of computing system that can be used to initiate network communications in a network environment. Endpoints 30(1)-30(N) can include, but are not limited to, mobile devices, servers, ATMs, IoT devices, laptops, desktops, tablets, gaming systems, mobile devices, smartphones, infotainment systems, smart appliances, global positioning systems (GPS), or any other device, component, or element capable of initiating voice, audio, video, media, or data exchanges within communication system 100. In some cases, an endpoint may also be inclusive of a suitable interface to a human user, such as a display, a keyboard, a touchpad, a remote control, other terminal equipment, or any suitable combination thereof.

In at least one example, endpoints 30(1)-30(N) and backend system 20 include software to achieve (or to foster) the remote endpoint information retrieval operations, as outlined herein. Each of these elements can have an internal structure (e.g., a processor, a memory element, etc.) to facilitate some of the operations described herein. In other embodiments, these remote endpoint information retrieval operations may be executed by hardware and/or firmware, executed externally to these elements, or included in some other network element or computing system to achieve this intended functionality. Alternatively, endpoints 30(1)-30(N) and backend system 20 may include this software (or reciprocating software) that can coordinate with other network elements or computing systems in order to achieve the operations, as outlined herein. In still other embodiments, one or several devices may include any suitable algorithms, hardware, software, firmware, components, modules, interfaces, or objects that facilitate the operations thereof. Modules may be suitably combined or partitioned in any appropriate manner, which may be based on particular configuration and/or provisioning needs.

In at least one embodiment, query engines 40(1)-40(N) are provided in query applications 38(1)-38(N) on endpoints 30(1)-30(N). Query engines 40(1)-40(N) can process queries configured in query language 24. For example, query engine 40(1) can receive and process a master query to search for particular data, to trigger certain actions (or responses) based on one or more conditions applied to information from events or functions, and/or to execute a desired response on endpoint 30(1). Queries can be configured to search for dynamic or historical information that is captured by data collectors on the endpoint. A search may include the act of finding or identifying certain desired information from a collection of information. In other instances, a search may include a request for information in which the requested information is retrieved from a known or determined location, module, etc. Data collectors can include persistent collectors 34(1)-34(N) (e.g., running continuously or at certain intervals, times of day, etc.) or dynamic collectors 36(1)-36(N) (e.g., running when information is requested by a query engine and the information requires collection). Data collectors can include plug-ins, scripts, or other suitable functions. Data that is captured on an endpoint may, in at least some embodiments, be stored on that endpoint. For example, data collected from persistent collectors 34(1)-34(N) may be stored in collected data databases 31(1)-31(N). In other implementations, collected data may be stored in whole, or in part, externally to endpoints 30(1)-30(N).

Figure 2:
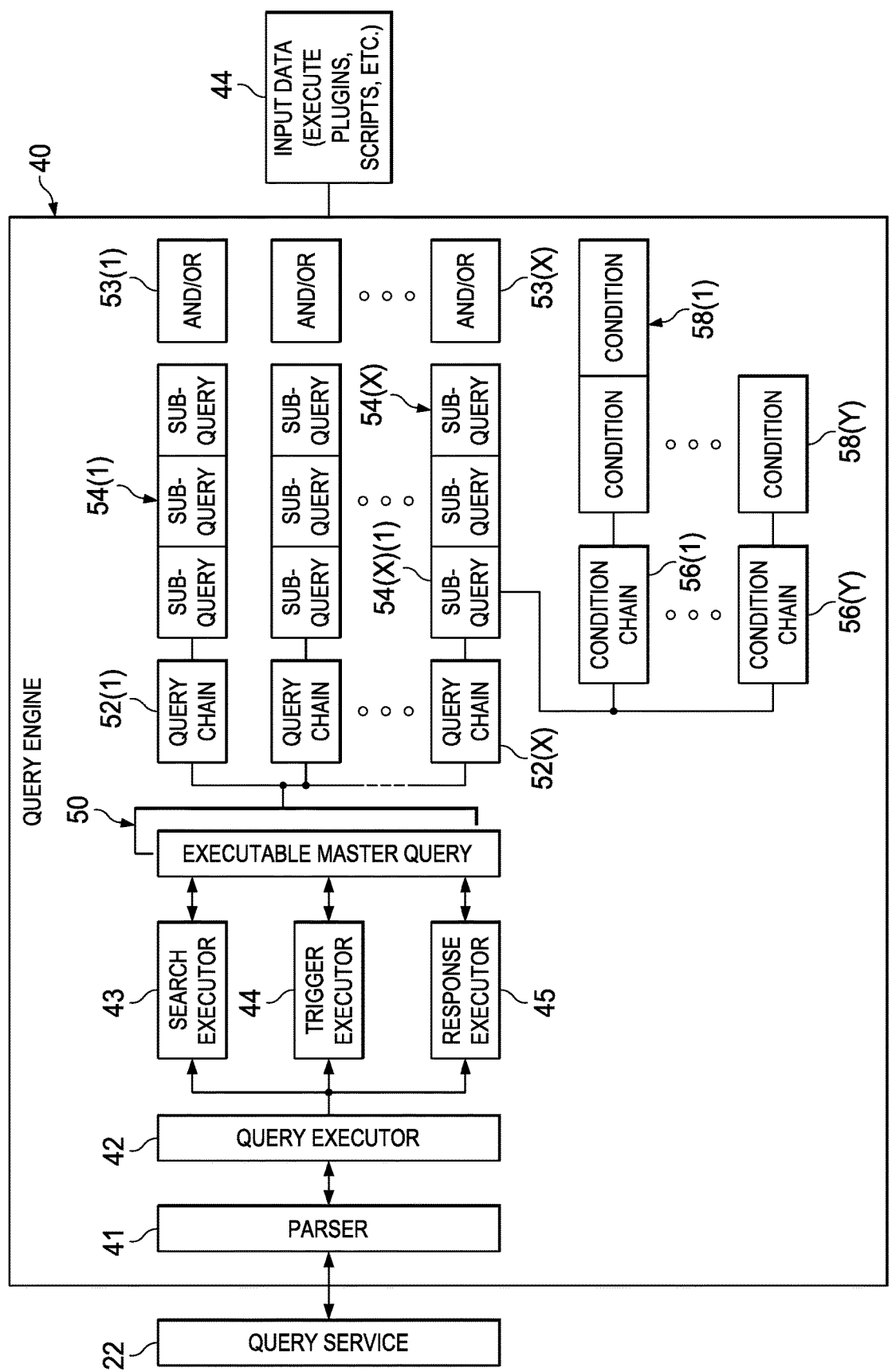
FIG. 2 is a simplified block diagram illustrating additional details of a query engine in an endpoint of the communication system according to at least one embodiment.

Turning to FIG. 2, FIG. 2 is a simplified block diagram illustrating one possible set of details associated with an example query engine 40 of an endpoint. Query engine 40 is representative of a possible configuration of query engines 40(1)-40(N) of endpoints 30(1)-30(N). Query engine 40 includes a parser 41, a query executor 42, a search executor 43, a trigger executor 44, and a response executor 45. Query engine 40 can process a master query from query service 22, into an executable master query 50. The executable master query 50 can comprise one or more query chains 52(1)-52(X), where each query chain includes a respective set of subqueries 54(1)-54(X). Each set of subqueries includes an operator 53(1)-53(X), such as logical operators 'AND', 'OR' or 'ALL'. Each subquery in a query chain can include one or more condition chains, such as condition chains 56(1)-56(Y) of a subquery 54(X)(1). Each condition chain includes a set of conditions, such as sets 58(1)-58(Y).

Query engine 40 may be called from the search, trigger, and response executors to process master queries. The executors may be configured to analyze the final results from master queries. Query engine 40 can receive a master query from query service 22. The master query may have been configured by an authorized user at backend system 20. Query engine 40 includes parser 41, which receives and parses the master query based on the query language (e.g., JSON). Parser 41 understands the defined interface of query language 24 and can form the master query into code that can be processed by other components in query engine 40. Query executor 42 may be built-in as part of query engine 40, and can build blocks from the parsed master query to process information retrieved by the one or more subqueries.

For each master query, an identifier and a type of action specify which executor is to be used (e.g., search, trigger, or response). Search executor 43 is used when the master query includes subqueries to search for certain information from the endpoint, but does not include any subqueries to perform actions in response to the search. Trigger executor 44 is used when the master query includes subqueries to apply certain conditions to output from a search or to information from an event and, when the conditions are satisfied, a response is triggered. Information from an event can be received by the query engine when an entry point is created. For example, an entry point could be created for something being monitored on the endpoint (e.g., file creation), and when an event is detected (e.g., a file is created), information related to this event can be provided to the query engine to be evaluated based on one or more conditions. Response executor 45 is used for executing a particular function to perform a desired action on the endpoint. Some responses are initiated when certain conditions are met, for example, when a master query includes subqueries that apply conditions to information from a search or event and triggers a response if the conditions are satisfied. Other responses can be initiated to perform a desired action on the endpoint without being dependent on conditions that need to be met.

Query engine 40 can build one or more query chains 52(1)-52(X) based on query chains defined in the master query. Query chains 52(1)-52(X) can be built for each executor according to a type of action (e.g., search, trigger, or response) indicated in the master query. Each query chain 52(1)-52(X) contains a respective set of subqueries 54(1)-54(X) to be executed. Query chains 52(1)-52(X) can also include several attributes including respective query operators 53(1)-53(X). Query operators could be logical 'AND', 'OR', or 'ALL', for example. Each query chain 52(1)-52(X) can be executed in parallel or sequentially. A result for a query chain (or 'query chain result') can be generated based on results of individual subqueries (or 'subquery results') in the set of subqueries associated with the query chain and on the query operator associated with the query chain. For example, a result for query chain 52(1) can be determined by using query operator 53(1) to evaluate the results of individual subqueries in set 54(1).

Operators can be used to evaluate any types of fields including strings, boolean, numbers, strings, array of objects, etc. The 'AND' operator executes a logical AND between two fields (or values within the fields). The 'OR' operator executes a logical OR between two fields (or values within the fields). The 'ALL' operator includes all fields (e.g., all subquery results) without considering the contents of the fields. Each query operator can also affect how a query chain is executed. For example, when using a logical 'OR', the first success (e.g., content is found, condition is met, etc.) can cause query engine 40 to stop processing the subqueries of the query chain. Also, when using a logical 'AND', the first failure (e.g., content not found, condition not met, etc.) can cause query engine 40 to stop processing the subqueries of the query chain. These scenarios are referred to herein as 'short-circuit logic'. It should be noted that other sets of subqueries in other query chains may continue to be processed, however, when the processing of a short-circuited set of queries is terminated. It should also be noted that short-circuit logic may also be applied to any other evaluations described herein in which logical operators are used.

Each set of subqueries 54(1)-54(X) includes one or more subqueries that contain logic to be executed. A subquery may contain a module identifier and a function identifier. These module and function identifiers can indicate which piece of code to call in order to satisfy the subquery. As used herein, a 'function' is intended to mean computer instructions (software, hardware, and/or firmware) that can be run on an endpoint to provide additional functionality to a query engine on the endpoint. Plug-ins and scripts are examples of functions. A plug-in or script may be called using the help of another component. For example, a module may call another module to retrieve information outside of the module domain (e.g., a file module may call a process module to retrieve information related to a process). In another example, a script may be executed by a SystemRunTime module that invokes the proper interpreter for that script. Input data 44 can be received by query engine 40 based on the particular function being executed. Input data 44 can be information retrieved from the endpoint by the function. Additionally, functions can be dynamically added, deleted, and modified on an endpoint without making changes to the query engine on that endpoint.

Persistent collectors 34(1)-34(N), dynamic collectors 36(1)-36(N), and response functions 32(1)-32(N) are intended to represent multiple instances of functions (or modules that call/execute/invoke functions) on endpoints 30(1)-30(N). Dynamic collectors represent functions (or modules that call/execute/invoke functions) on an endpoint that can be dynamically called by a query engine on the endpoint to obtain real-time data on the endpoint. Persistent collectors represent functions (or modules that call/execute/invoke functions) on an endpoint that run continuously or at certain intervals, times of day, etc. to monitor any desired aspect of the endpoint (e.g., files, processes, network activity, memory, etc.). In some instances, persistent collectors 34(1)-34(N) may store monitored data (e.g., file changes, network packets, etc.) in respective collected data databases 31(1)-31(N) on respective endpoints 30(1)-30(N). Thus, a master query may cause a collected data database to be searched for recent or past data populated by persistent collectors. Response functions 32(1)-32(N) represent functions (or modules that call/execute/invoke functions) on an endpoint that perform particular actions on the endpoint to, for example, remediate a compromised endpoint.

In accordance with at least one embodiment, each subquery in a master query can include fields for at least one condition chain, a set of conditions for each condition chain, and an output. For a particular subquery (e.g., subquery 54(X)(1)), a determination is made as to whether a result (indicated by the output field) of the particular subquery should be part of the query engine output (or master query result). This determination can be made by using a query operator to evaluate results from each subquery in a query chain. If an output field of a subquery is empty, then it may be considered a boolean condition. Query engine 40 can also allow filtering to specify which fields should be included in a subquery result to be returned. For example, JSON arrays by index, multiple fields, etc. are examples of content that may be filtered from a subquery result before it is returned.

Examples of condition chains and conditions are illustrated in FIG. 2, where subquery 54(X)(1) includes condition chains 56(1)-56(Y), which include respective sets of conditions 58(1)-58(Y). Each set of conditions can include one or more conditions. Condition chains 56(1)-56(Y) have a condition chain operator, such as logical 'AND' or 'OR', that determines the result between the condition chains. A result for a subquery (or 'subquery result') can be generated based on the results of each condition chain (or 'condition chain results') of the subquery and the condition chain operator associated with the subquery. For example, a result of subquery 54(X)(1) can be determined by using the condition chain operator to evaluate the condition chain results of condition chains 56(1)-56(Y). The condition chain operator can also affect how the condition chains are executed. For example, short-circuit logic may be used in at least some embodiments.

Each condition chain of a subquery includes a set of conditions to evaluate the output of each subquery function. For example, condition chains 56(1)-56(Y) of subquery 54(X)(1) include sets of conditions 58(1)-58(Y). Each condition chain 56(1)-56(Y) can be executed in parallel or sequentially. A result for a condition chain can be generated based on results of conditions (or 'condition results') in the set of conditions associated with the condition chain and on a condition operator associated with the condition chain. For example, a result for condition chain 56(1) can be determined by using a condition operator associated with condition chain 56(1) to evaluate the condition results of individual conditions in set 58(1).

In accordance with at least one embodiment, each condition can include various fields to implement that condition. In at least one embodiment, a condition can be applied to output returned by a function. By way of example, certain possible fields are now described. A 'target' field may specify which field, in the output returned by a function, to use for a condition check. A special '$result' variable can be used by query engine 40 to hold the output of the function. A 'value' field (containing a single value or list of values) can be used to check the output against, and a 'valueType' field can be used to coerce the value at engine level. More fields such as 'case sensitive', 'negate', and 'operator' may also be available. The 'operator' field could include, but is not limited to, data that indicates any one of equals, exists, greater-than-or-equal-to, greater-than, less-than, less-than-or-equal-to, and the negated versions thereof. Furthermore, the condition evaluation may also apply short-circuit logic, but may depend on if the output is required or not.

A condition itself may serve to filter certain information from function output. For example, assume a function searches all active processes on an endpoint and returns a list of the processes as its output. A condition applied to the output to match (equals to) processes with the name '*.email.exe' can cause all of the processes that do not match the name '*.email.exe' to be filtered out. In another example, assume a function searches for all network activity during a defined time period. A condition applied to the output to match network events associated with a particular Internet Protocol (IP) address can cause all of the network events that are not associated with the particular IP address to be filtered out.

A master query result can be determined after every condition is evaluated to render a condition chain result, after every condition chain result is evaluated to render a subquery result, and after every subquery result is evaluated to render a query chain result. In some instances, however, certain results (e.g., query chain, subquery, condition chain) may not be generated if short circuit logic has been applied. A master query result can be generated based on query chain results and a query chain operator, which could be a logical 'AND' or 'OR', for example. Query engine 40 may also determine success or failure of the master query and can return the master query result to query service 22 in backend system 20.

A 'join' output field may be used to cause output from different functions to be joined or merged into one result. For example, assume two subqueries (e.g., in different query chains) are defined in a master query and each subquery performs one of the following functions: GetUserNames and GetBrowserHistory. Further assume the GetUserNames function returns {"id":2, "name":"john"} and the GetBrowserHistory function returns {"url": www.xyz.com, "user_id":"2"}. By using the 'join' capability, a single result may be retrieved from the master query. If the user_id field of GetBrowserHistory is joined with the id field of GetUserNames, the final result could be {"url": www.xyz.com, "user_id":"2", "name":"john"}. Thus, output from different functions can be merged based on specified fields that have the same value in the outputs that are merged. The merged information can contain all of the fields from each output. Additionally, conditions and filters may be applied to the outputs before they are merged.

Figure 3:
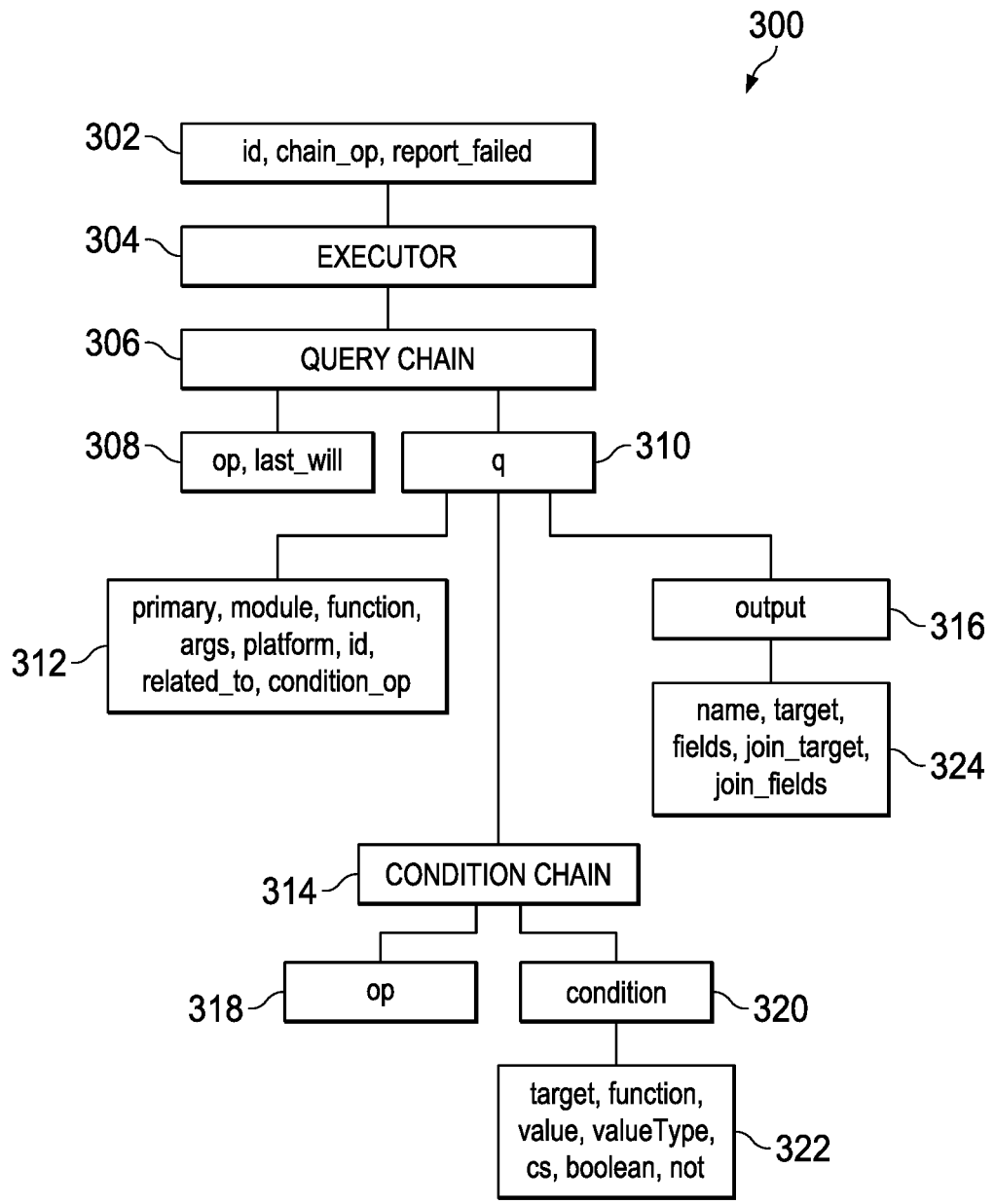
FIG. 3 is a hierarchical diagram of an example query language that may be used in the communication system according to at least one embodiment.

Turning to FIG. 3, FIG. 3 shows a hierarchical diagram 300 of one possible embodiment of query language 24, which can be used to configure master queries for execution in query engines of endpoints. An authorized user may configure a master query based on query language 24. The master query can be processed and executed by query engines in endpoints to determine a sequence of actions to invoke (e.g., searches, triggers, responses), and to perform output processing and conditional checks on each result if needed. In at least one embodiment, query language 24 can be based on JavaScript Object Notation (JSON) and provides an advantageous balance between performance and dynamic schemas on searches, triggers, and responses. Query language 24 also enables output to be filtered once conditions have been applied.

A master query can include an array of objects that identify several types of actions related to data that is stored on or otherwise available from an endpoint where the master query is executed by a query engine. In at least one embodiment, the types of actions share the same query structure although some fields may be ignored. In one example, the types of action are identified in query language 24 as 'queries', 'triggers', and 'responses'. A queries object can include an array of subquery objects that contains functions to be executed to search for data associated with the endpoint. A triggers object can include an array of subquery objects that contains functions to be executed, which can trigger a response on the endpoint if a determination is made that one or more conditions based on a search or an event are satisfied. A responses object can include an array of subquery objects that contains functions to be executed to perform a desired action on the endpoint (e.g., remediation actions if the endpoint is compromised).

With reference to hierarchical diagram 300, master query object fields can include id, chain_op, and report_failed as indicated at 302. Master query object fields are described in more detail in Table 1 below.

TABLE 1

Master Query Object Fields

| Name | Type | Description |
| --- | --- | --- |
| id | String | Master Query ID |
| chain_op | String | "and": Execute a logical AND between the chains. The first chain that fails will stop execution and consider the master query as failed. |

TABLE 1-continued

Master Query Object Fields

| Name | Type | Description |
| --- | --- | --- |
| report_failed | Boolean | "or": Execute a logical OR between chains. The first chain that succeeds will stop execution and consider the master query as OK. If true, the client will answer with "*fail*" key if master query didn't succeed. |

An executor 304 can be an object name that indicates what type of action (e.g., searches, triggers, responses) is requested in a master query. In at least one embodiment, the object name could be 'queries' for search actions, 'triggers' for trigger actions, and 'responses' for response actions. A query chain 306 can be configured in a master query after executor 304. Query chain fields can include op, last_will, and q as indicated at 308 and 310. Query chain fields are described in more detail in Table 2 below.

TABLE 2

Query Chain Object Fields

| Name | Type | Description |
| --- | --- | --- |
| op | String | "and": Execute a logical AND between the subqueries. The first that fails will stop execution and consider the query chain as failed.<br>"or": Execute a logical OR between subqueries. The first that succeeds will stop execution and consider the query chain as OK.<br>"all": Execute all the subqueries without considering success or failure during evaluation. This can be used when all collectors are executed independently of conditions and results. |
| last_will | Boolean | Instruct the engine to execute the chain if all the other chains evaluated to success. (ex: query + response) |
| q | Array of Objects | Subqueries objects that belong to this chain. |

The q field at 310 includes one or more query objects (also referred to herein as 'subquery objects') for a query chain. Subquery object fields are used to define the subquery objects and can include primary, module, function, args, platform, id, related_to, condition_op, condition, and output, indicated at 312, 316, and 320. Subquery object fields are described in more detail in Table 3 below.

TABLE 3

Subquery Object Fields

| Name | Type | Description |
| --- | --- | --- |
| primary | Boolean | If the query is "PRIMARY" then all the conditions will by default filter the output based on the condition. If it's not primary then a boolean condition will be applied where the content won't be filtered |
| module | String | The collector name (aka 'Namespace') |
| function | String | This matches with the collector's function to use |
| args | Object with key: values as strings | Object with a collection of key/value pairs with the arguments to be passed to the function when invoked. The list of arguments need to be supported by the function (search/trigger/response) |
| condition | Array of Objects with key: values (some fields may be number, string, bool, etc.) | This is the condition that is evaluated against the $result of the function to filter the data<br>When primary: true, the condition will also affect the output, else will be a boolean condition by default |
| condition_op | String | "and"/"or" |
| platform | String | This is the platform type (e.g., "windows", "linux"). |
| output | Object with key: values as strings | The data to project from the subquery. This is expressed as a key/value pair. |
| id | String | An identifier (id) to identify this subquery |
| related_to | String | Should contain a subquery id (id field is required in this case) |

A conditions chain 314 can be configured in a subquery of a master query. One or more conditions 320 for each condition chain can be configured using condition fields that can include op, target, function, value, valueType, cs, boolean, and not, as indicated at 318 and 322. Condition fields are described in more detail in Table 4 below.

Turning to FIG. 4, FIG. 4 shows a simple example of a master query 400 written in query language 24, as defined above. At 402, a master query ID is defined. At 404, the executor is provided as 'queries', which indicates the master query is configured for performing a search of data stored in or otherwise available from an endpoint (e.g., dynamic

TABLE 4

Condition Fields

| Name | Type | Description |
| --- | --- | --- |
| target | | The target projection to compare.<br>If it is an array and special wildcard is used, each field of an object inside the array will be compared against the value based on the operator.<br>Examples: If the collector returns {"key": "XXXX"}, to compare that value, the projection can be $result.key<br>If the collector returns {"files": [{"name": "222", "size": "3333"}, {"name": "444.txt", "size": "1"}]} to check if any of those values has the name equal to "444.txt", projection can be $result.files.name (operator: "eq", value: "444.txt") |
| function | String | If present, the function name if available can be called for comparison. (Ex: "count", "merge", etc.) |
| op | String | Operators: "eq", "ne", "lte", "gte", "not_exists", "exists", "contains", "ne", etc.<br>Behavior may change if looking inside an array of object. |
| value | Number, string, boolean | Based on the value type set, the result of the collector will be converted to the same type to do the proper comparison.<br>Values can also refer to values inside the same object as projections. It works for collectors that have OUTPUT (not boolean conditions).<br>Example: If collector returned "5" and value is 4, then "5" is converted to number and compared against 4. |
| valueType | String | Coerce the value to this type.<br>"number", "string", "Boolean", "date", "ipv4"<br>Date is UTC + 0, and possibly ISO format. Local dates retrieved by collectors should be also converted to UTC + 0. This is to unify the output results since each EP can have different time zones. |
| boolean | Boolean | True if this is a Boolean condition where the output should not be filtered but just have a condition check.<br>Example: If true or the query is not primary, looking for "cmd.exe" if matched will return all process list. |
| not | Boolean | Negate the condition result if set to true. |
| cs | Boolean | If false, the string operations won't be case-sensitive. (May be case-sensitive by default) |

The output field at 316 includes a subquery result from a subquery. Output fields are used to define the subquery result and can include name, target, fields, join_target, and join_field, indicated at 324. Output fields are described in more detail in Table 5 below.

information obtained from a plug-in or script, previously collected information stored on the endpoint, etc). In this example, there is no chain_op field in the master query because only one query chain is included.

TABLE 5

Output Fields

| Name | Type | Description |
| --- | --- | --- |
| name | String | The name of the output field with the target result.<br>Example: If set to "var1", the output result contains a field "var1": OUTPUT_TARGET |
| target | String | If not present, no output is returned from this collector, trap, etc.<br>To retrieve all the output, use "$result".<br>To retrieve partial output use something like "$result.files.size" to retrieve all the size elements inside the array of objects, etc.<br>To retrieve only ALL of just one field, use the same format.<br>To retrieve multiple fields then "fields" is used. |
| fields | Array of Strings | The field names to be extracted as output |
| join_target | String | The name of the target field to use as join. (This is the output name) If the OuputName is "users", then "users.user" should be used. |
| join_field | String | The name of the current field to join and compare against join_target. |

At 406, query chain object fields are provided to define a query chain. A query operator is defined as 'all' and the q field indicates one or more queries are defined. At 408, a subquery object is provided with several subquery object fields: platform, module, function, and arguments. The subquery object defines a subquery of the query chain. The subquery is configured to execute a function to search a Windows based platform. Parameters (or arguments) can be passed to the function to refine the search. The parameters provided in 408 include a C drive, files having a filename that matches '*.pepe', and files having 'malware' in their content.

Also at 408, other subquery object fields are used to indicate a condition is to be applied to the returned search results (i.e., the output) of the function. A condition chain operator is defined as 'and' to evaluate results from multiple condition chains. However, in this example master query 400, a single condition is defined by condition fields at 410, and therefore a condition chain operator is not needed. The condition is applied to determine success or failure of whether the search produced a number of files greater than zero. In addition, the condition is indicated as 'primary', which causes all conditions to filter the output based on the condition. Thus, the subquery result includes only results having a field files>0.

At 412, an output field provides a name of the subquery result ("fileoutput"), the actual search results ("$result.files"), and the output to be extracted to generate the subquery result ("name" of the files in the search results).

At 414, the executor is provided as 'responses', which indicates the master query is configured for performing some action on the endpoint. As shown at 416, a query operator is defined as 'and' and the q field indicates one or more subquery objects are defined. As noted at 416, the subquery objects may be configured in the same manner as they are configured in a master query for 'queries'.

At 418, the executor is provided as 'triggers', which indicates the master query is configured for determining whether a condition is met and then responding (performing an action on the endpoint) based on the condition being met. As shown at 420, a query operator is defined as 'and' and the q field indicates one or more subquery objects are defined. As noted at 420, the subquery objects may be configured in the same manner as they are configured in a master query for 'queries'.

Figure 5:
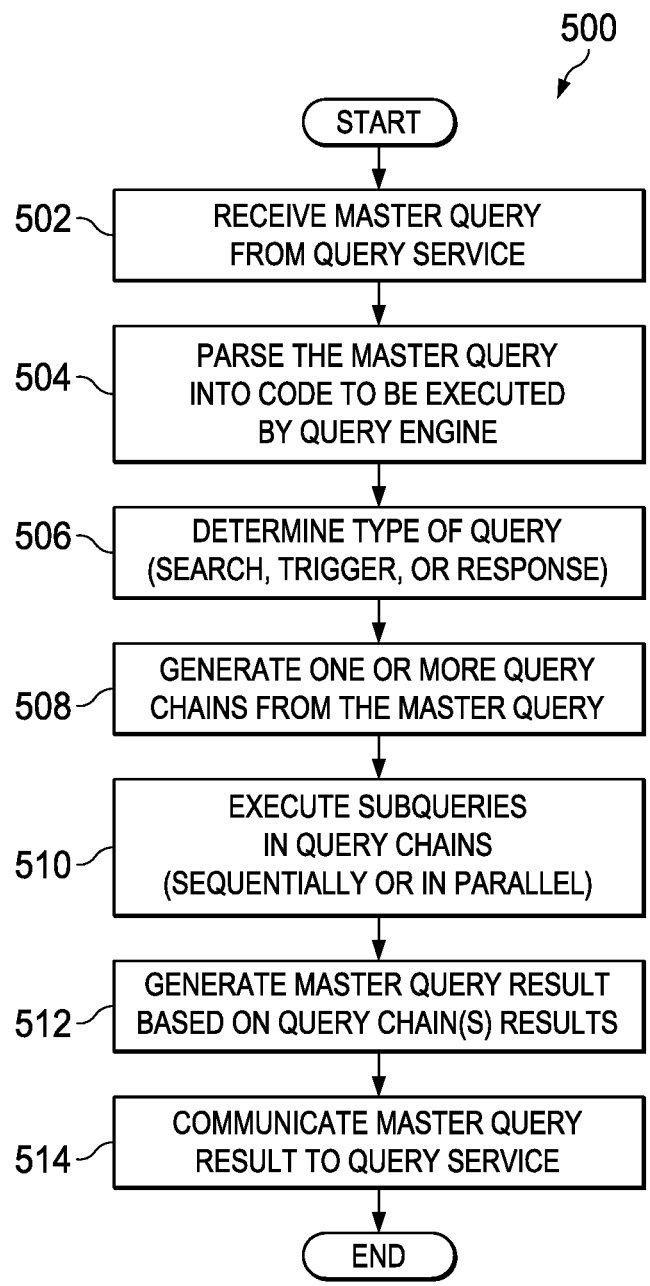
FIG. 5 is a simplified flowchart illustrating possible activities associated with at least one embodiment of the communication system according to the disclosure.

FIG. 5 is a simplified flowchart of a possible flow 500 of operations that may be associated with embodiments described herein. In at least one embodiment, a query engine in an endpoint (e.g., query engine 40) may execute one or more sets of operations associated with flow 500. The query engine may comprise means, such as one or more processors for performing the one or more operations.

Flow 500 can begin at 502 where query engine 40 receives a master query from a query service. The master query may have been configured by an authorized user at a backend system, for example. At 504, the master query is parsed into code that can be processed by other components in the query engine. At 506, a determination can be made as to the type of action (or actions) requested in the master query. The type of action can be searching for desired data, triggering a response on the endpoint based on one or more specified conditions, or executing a particular response on the endpoint. In at least one embodiment, the searching, triggering, and response actions can be indicated in the master query by object names of 'queries', 'triggers', and 'responses', respectively. Also, in some instances, one or more types of action may be included in the same master query.

At 508, the query engine can generate one or more query chains to be executed based on query chains defined in the master query. At 510, subqueries in the query chains can be executed. The query chains may be executed sequentially or in parallel. In some scenarios, short circuit logic may be used for the query chains. For example, when short circuit logic is used, not all query chains are executed if a query chain operator is 'OR' and one of the query chains indicates a successful result from its queries. In this case, once the successful result is determined, the processing may end and any remaining unexecuted query chains may not be executed.

At 512, a master query result can be generated when all of the query chains have returned a query chain result, or when short circuit logic is used and the actual returned results indicate that other query chains need not be executed. At 514, the master query result can be communicated back to the query service, or to any other appropriate entity, node or person.

Figure 6:
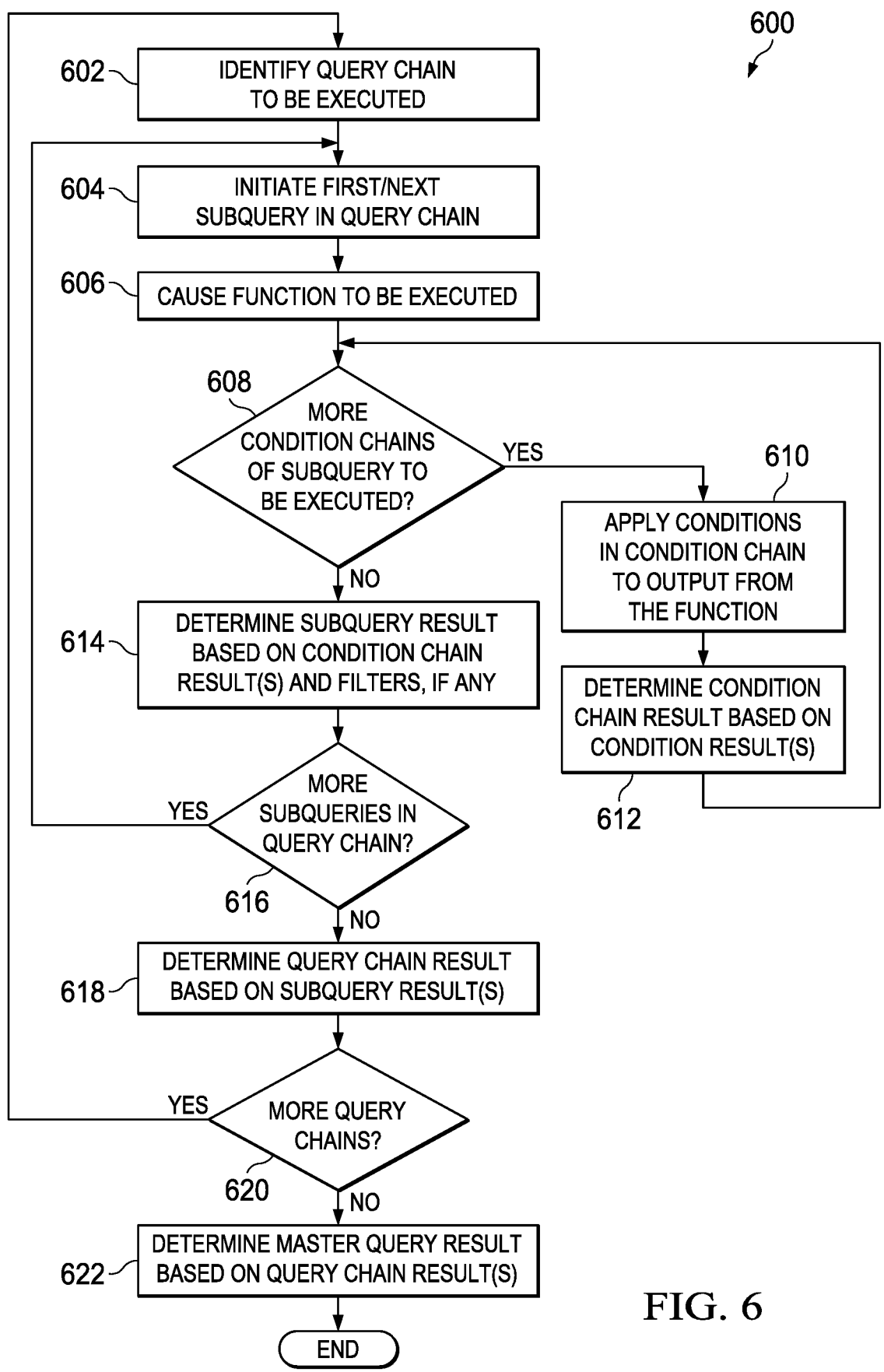
FIG. 6 is a simplified flowchart illustrating possible activities associated with at least one embodiment of the communication system according to the disclosure.

FIG. 6 is a simplified flowchart of a possible flow 600 of operations that may be associated with embodiments described herein. In at least one embodiment a query engine in an endpoint (e.g., query engine 40) may execute one or more sets of operations associated with flow 600. The query engine may comprise means, such as one or more processors for performing the one or more operations. Flow 600 illustrates sequential execution of query chains, subqueries, condition chains, and conditions, which are defined in a master query. However, it will be apparent that any one or more of these activities could be executed in parallel, or any suitable combination of sequential and parallel execution could be used.

Flow 600 may begin at 602, where a query chain to be executed is identified. At 605, the appropriate executor (i.e., search, trigger, response) in the query engine can initiate execution of the first subquery in the identified query chain. At 606, a function defined in the first subquery can be executed. Output produced by the function can be returned to the query engine. The output can contain information associated with the execution of the function. The particular content and format of the function output can depend upon the particular function being executed.

Examples of functions include, but are not limited to searching for data on an endpoint (e.g., persistent collectors 34(1)-34(N), dynamic collectors 36(1)-36(N)) or executing a response on the endpoint (e.g., response functions 32(1)-32(N)). A search could include searching for data already collected and stored (e.g., collected data database 24). Such data could be collected by a persistent collector that collects data on the endpoint continuously or at predefined intervals, times, etc. An example of a persistent collector could include, but is not limited to a network plug-in that captures network traffic on the endpoint. Another search could include dynamically collecting information in real-time by a dynamic collector. Examples of dynamic collectors include, but are not limited to a file plug-in that searches the file system for new and/or updated files on the endpoint, or a process monitor that captures current process activity on the endpoint. Moreover, any other script or plug-in could be dynamically executed on the endpoint to search for and obtain desired information.

A response is generally configured to cause a desired action on an endpoint. In at least some scenarios, responses are used to perform remedial actions on an endpoint after a determination is made that the endpoint has been compromised. Responses can be executed, for example, by running a script on an endpoint to perform the desired action. Examples of actions include, but are not limited to, removing/deleting a file, quarantining a file, sending an email, sending a notification to an appropriate receiver (e.g., Incident Responder, backend system, other device, etc.), killing a particular process, rebooting or shutting down the endpoint, or taking any other action needed to remediate the condition that originated a compromise on the particular endpoint.

In at least one embodiment, processing condition chains in a subquery can occur as indicated at 608-612. Condition chains, if any, can be executed to apply one or more conditions to the output from the function. In at least one embodiment, a condition may be a comparison between certain fields in the output and a predefined value (e.g. selected by an administrator who configured the master query). The comparison may be made using an operator such as equals to, not equal to, less than or equal to, greater than or equal to, less than, greater than, does not exist, exists, contains, etc. The comparison may be made on a string, number, or boolean values.

At 608, a determination can be made as to whether more condition chains of the subquery are to be executed. If any condition chain of the subquery still needs to be executed, then at 610, a condition in the condition chain may be applied to the function output to generate a result for the condition (or 'condition result'). If the condition chain includes multiple conditions, then each condition may be applied to the function output to generate respective condition results. At 612, a single result for the condition chain can be determined. If a single condition exists in the condition chain, then the condition chain result can be equivalent to the condition result of the single condition. In scenarios where multiple conditions are configured for a condition chain, however, a condition chain result for the condition chain may be determined by using a condition operator (e.g., logical 'AND' or 'OR') to evaluate condition results corresponding to the multiple conditions in the condition chain.

Processing may continue at 608, where another condition chain of the subquery may be executed. When there are no more condition chains to be executed for a subquery, then at 614, a subquery result may be generated based on the one or more condition chain results and filters, if any. If a single condition chain result is produced, then any filters may be applied to the condition chain result to generate the subquery result. In scenarios where multiple condition chains are configured for a subquery, however, a single subquery result for the subquery may be determined by using a condition chain operator (e.g., logical 'AND' or 'OR') to evaluate condition chain results corresponding to the multiple conditions chains in the subquery. Additionally, filters may be applied to include only desired information in the subquery result.

Any type of filter may be configured by an administrator to obtain desired information. For example, function output may contain multiple metadata fields of a file (e.g., name, size, content, date created, last modification, creator, etc.). A condition may include selecting files based on particular metadata fields. However, a filter may be applied so that only the names of the files that meet the condition criteria are included in the subquery result. As previously described herein, however, in some instances, a condition itself may operate to filter the output to generate a condition result. For example, if the 'primary' subquery object field is set to "true", then the condition can filter the output based on the condition.

In at least one embodiment, processing subqueries in a query chain can occur as indicated at 604-616. Subqueries can be executed to perform a function, apply conditions, and generate a subquery result. At 616, a determination can be made as to whether more subqueries of the query chain still need to be executed. If any subquery of the query chain still needs to be executed, then processing can return to 604 to identify the next subquery for execution. Processing may continue as previously described herein to generate a subquery result at 614.

If no more subqueries are to be executed, then at 618, a single result for the query chain (or 'query chain result') may be determined. If a single subquery is configured for the query chain, then the query chain result can be equivalent to the subquery result of the single subquery. In scenarios where multiple subqueries are configured for the query chain, however, a single result for the query chain may be determined by using a query operator (e.g., logical 'AND', 'OR', 'ALL') to evaluate subquery results corresponding to the multiple subqueries in the query chain.

At 620, a determination can be made as to whether more query chains in the master query are to be executed. If any query chain still needs to be executed as determined at 620, then processing may continue at 602, where another query chain of the master query can be identified and executed. When there are no more query chains to be executed, then at 622, a master query result may be generated based on the one or more query chain results. If a single query chain result is produced, then the master query result may be equivalent to the query chain result of the single query chain. In scenarios where multiple query chains are configured in the master query, however, a single master query result may be determined by using a query chain operator (e.g., logical 'AND' or 'OR') to evaluate query chain results corresponding to the multiple query chains.

Figure 7A:
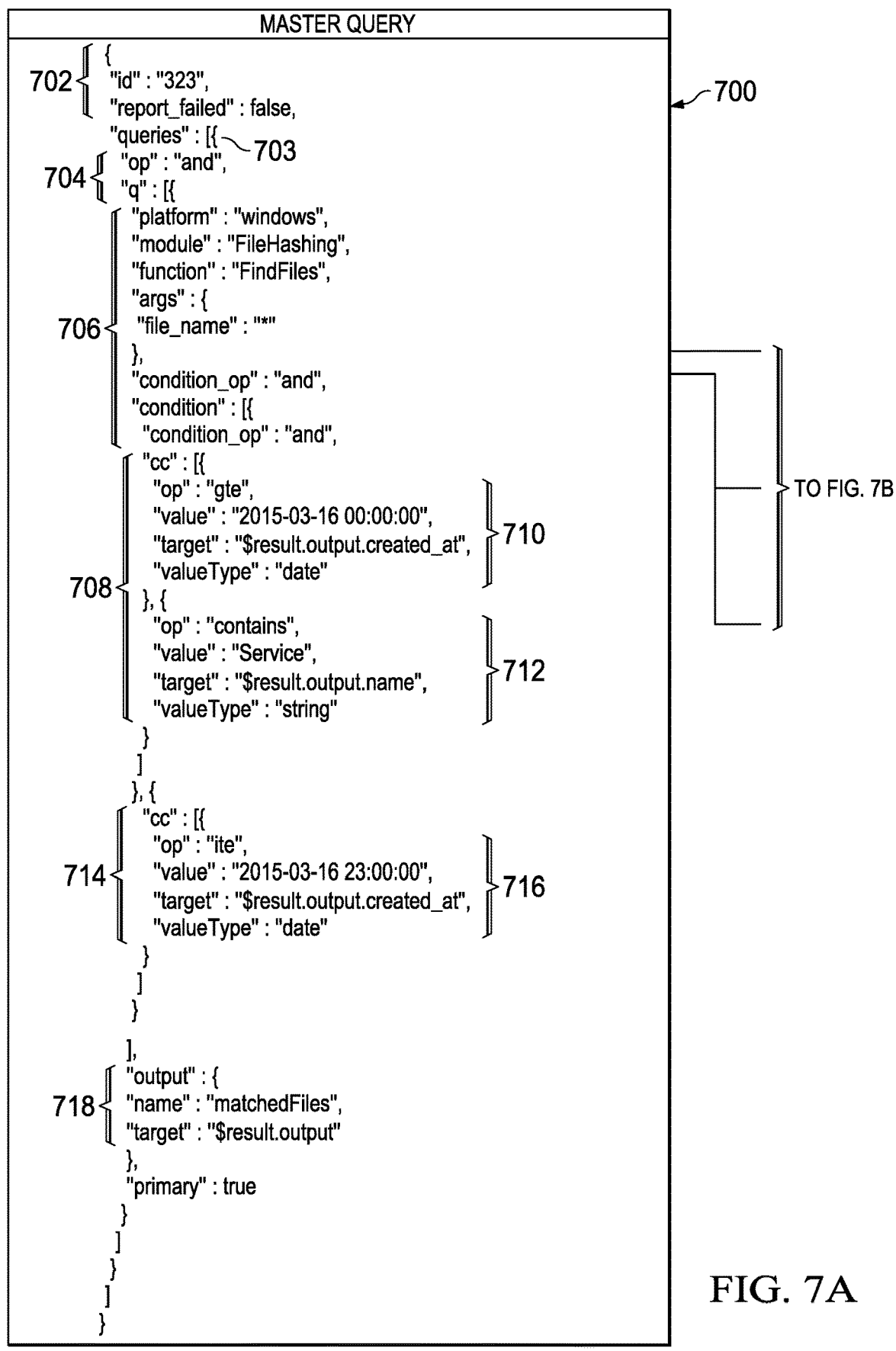
FIGS. 7A-7B show an example master query and an example master query result in the communication system according to at least one embodiment.
Figure 7B:
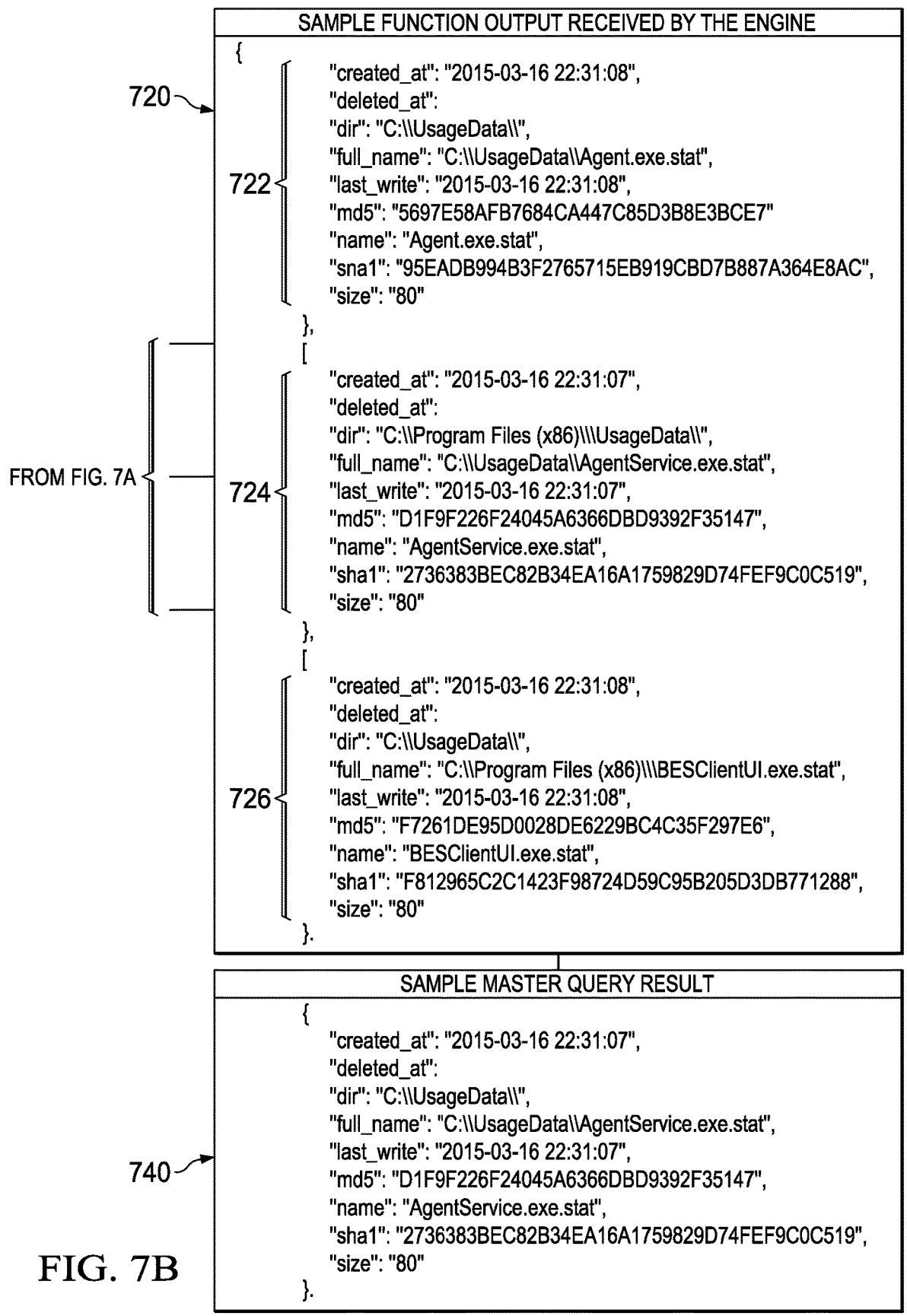

Turning to FIGS. 7A-7B, FIGS. 7A-7B show an example master query 700 written in query language 24, an example function output 720, and an example master query result 740. At 702, a master query ID is defined as '323'. The executor is provided as 'queries' at 703, which indicates that master query 700 is configured for performing a search of data stored in or otherwise available from an endpoint (e.g., dynamic information obtained from a plug-in or script, previously collected information stored on endpoint, etc.). In this example, there is no chain_op field in the master query because only one query chain is included.

At 704, query chain object fields are provided to define a query chain. A query operator is defined as 'and' and the q field indicates one or more subqueries are defined. In this example, only one subquery is defined. At 706, a subquery object is provided with several subquery object fields: platform, module, function, and arguments. The subquery object defines the subquery of the query chain. The subquery is configured to execute a function to search a Windows based platform. Parameters (or arguments) can be passed to the function to refine the search. The parameters provided in 706 include any filename. Thus, in this example, a function output includes a listing of all files found on the endpoint. The listing includes file information (e.g., creation date/time, deletion date/time, directory path, full path and file name, last write, one or more hashes, file name, and size) for each file that is found in the search.

At 706, additional subquery object fields are used to indicate a condition is to be applied to the returned search results (i.e., the output) of the function. A condition chain operator is defined as 'and' to evaluate results from multiple condition chains. In this example master query 700, a first condition chain 708 and a second condition chain 714 are defined. First condition chain 708 includes a first condition 710 and a second condition 712. First condition 710 is applied to the files listed in the function output to identify all files having a creation date greater than or equal to 2015-03-16 00:00:00. Second condition 712 is applied to the files listed in the function output to identify all files having the value 'Service' in the file name. Condition results for condition 710 include file information 722, 724, and 726 of the function output. Condition results for 712 include file information 724 of the function output. The condition operator for condition chain 708 is 'and'. Therefore, a condition chain result of condition chain 708 includes only file information 724, which is included in condition results for both condition 710 and condition 712.

Second condition chain 714 includes one condition 716 that is applied to the files listed in the function output to identify all files having a creation date less than or equal to 2015-03-16 23:00:00. Condition result for condition 716 includes file information 722, 724, and 726 of the function output. This condition result is the condition chain result of condition chain 714. The condition chain operator is 'and'. Thus, a subquery result includes only file information 724, which is included in both condition chain results 708 and 714. In this example, the master query result is determined based on a query chain result of the single query chain, and the single query chain result is determined based on the subquery result of the single subquery. Therefore, master query result 740 is determined to include only file information 724.

Embodiments of communication system 100 described herein offer users the ability to create complex queries to retrieve desired real-time or historical data and to respond as needed to remediate compromised endpoints. The dynamic nature of embodiments disclosed herein can be exploited for a wide variety of use cases to not only analyze information, but to serve as a query engine for any type data associated with an endpoint. For example, the query engine can be exploited to analyze everything from credit fraud data information to answers provided in a quiz application. A few illustrative use cases are now provided. A master query can be configured to request information only from endpoints that match a specified query (e.g., based on query chains, subqueries, condition chains, conditions) and then to reduce the actual data being returned. For example, a master query might request all current endpoints 1) that have a process currently executing with the name 'malware.exe' or with a sha1 hash that equals 'xxxxxxxxx', and 2) that have made a connection to destination port 911 in the last 24 hours.

Other uses cases can include transforming Indicators of Compromise (IOCs) to the query language to detect compromised endpoints. IOC information can be used to set up triggers and responses. For example, a master query based on an IOC might request a particular script to be executed when a certain event occurs. Assume the event is the creation of a new file having a size>10, located in file directory C:\\temp. In this example, if a file is created, the query engine receives a notification of the event (e.g., a file was created) and conditions can be used to evaluate the size and location of the file. If the file meets the desired criteria, then a response can be executed to run the desired script. Additionally, query engine 40 can run as a standalone server to serve requests for other types of processing. For example, HyperText Markup Language Revision 5 (HTML5) can use the query engine to remotely analyze JSON with certain conditions such as "all tweets that contained 'Johnny' as an author and where the tweet text was written 2 days ago."

Figure 8:
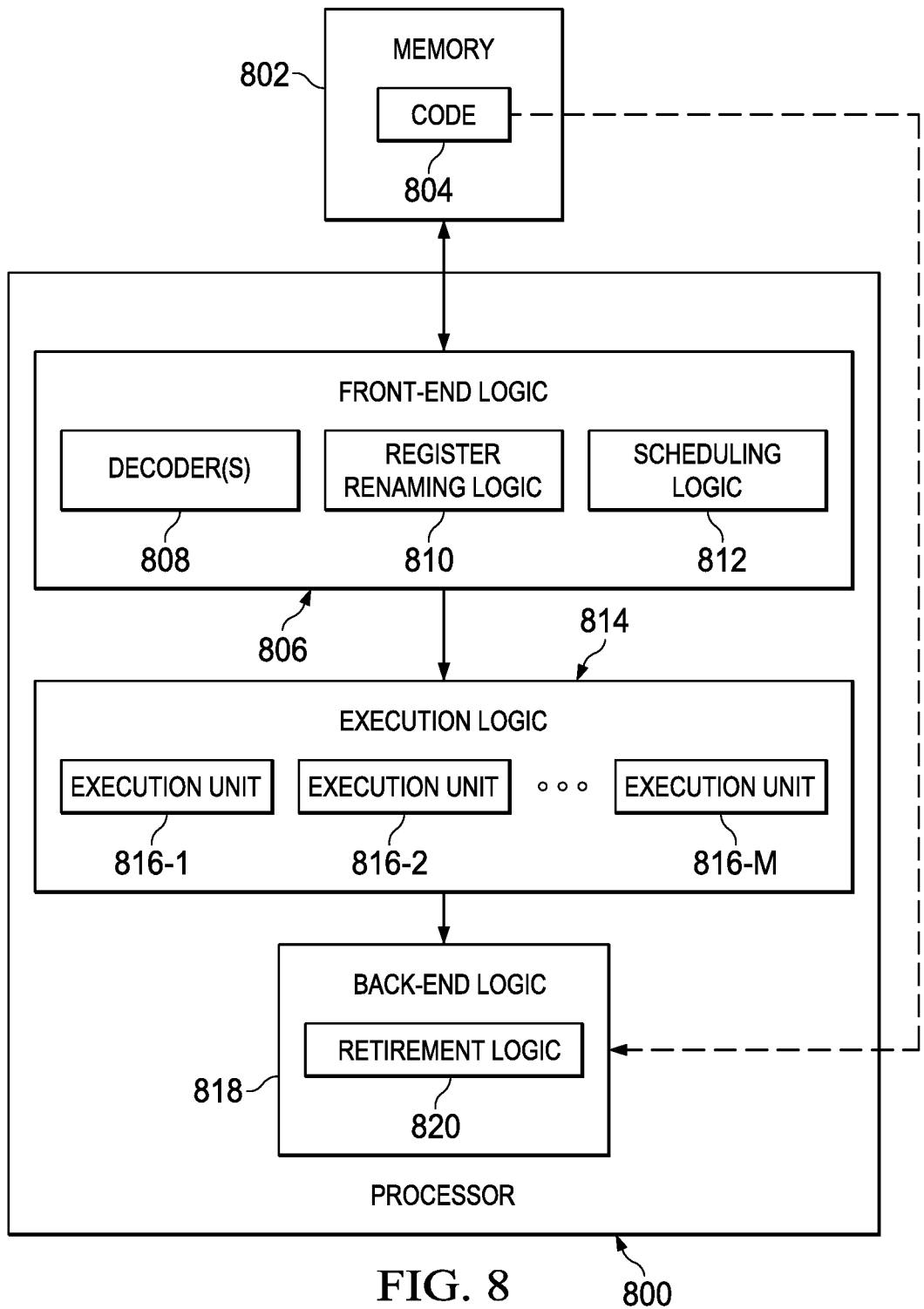
FIG. 8 is a block diagram of a memory coupled to an example processor according to at least one embodiment.

FIG. 8 is an example illustration of a processor according to an embodiment. Processor 800 is one possible embodiment of processors 39(1)-39(N) of endpoints 30(1)-30(N) and of backend system 20. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 is one embodiment of memory element 37(1)-37(N) of endpoints 30(1)-30(N) and of backend system 20. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Code 804, which may be one or more instructions to be executed by processor 800, may be stored in memory 802. Code 804 can include instructions of various modules (e.g., query service 22, query applications 38(1)-38(N), query engines 40(1)-40(N), response functions 32(1)-32(N), persistent collectors 34(1)-34(N), dynamic collectors 36(1)-36(N), query engine 40 and its components, etc.) that may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816-1 through 816-M. Some embodiments may include a number of execution units dedicated to specific functions or sets of functions. Other embodiments may include only one execution unit or one execution unit that can perform a particular function. Execution logic 814 can perform the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

Figure 9:
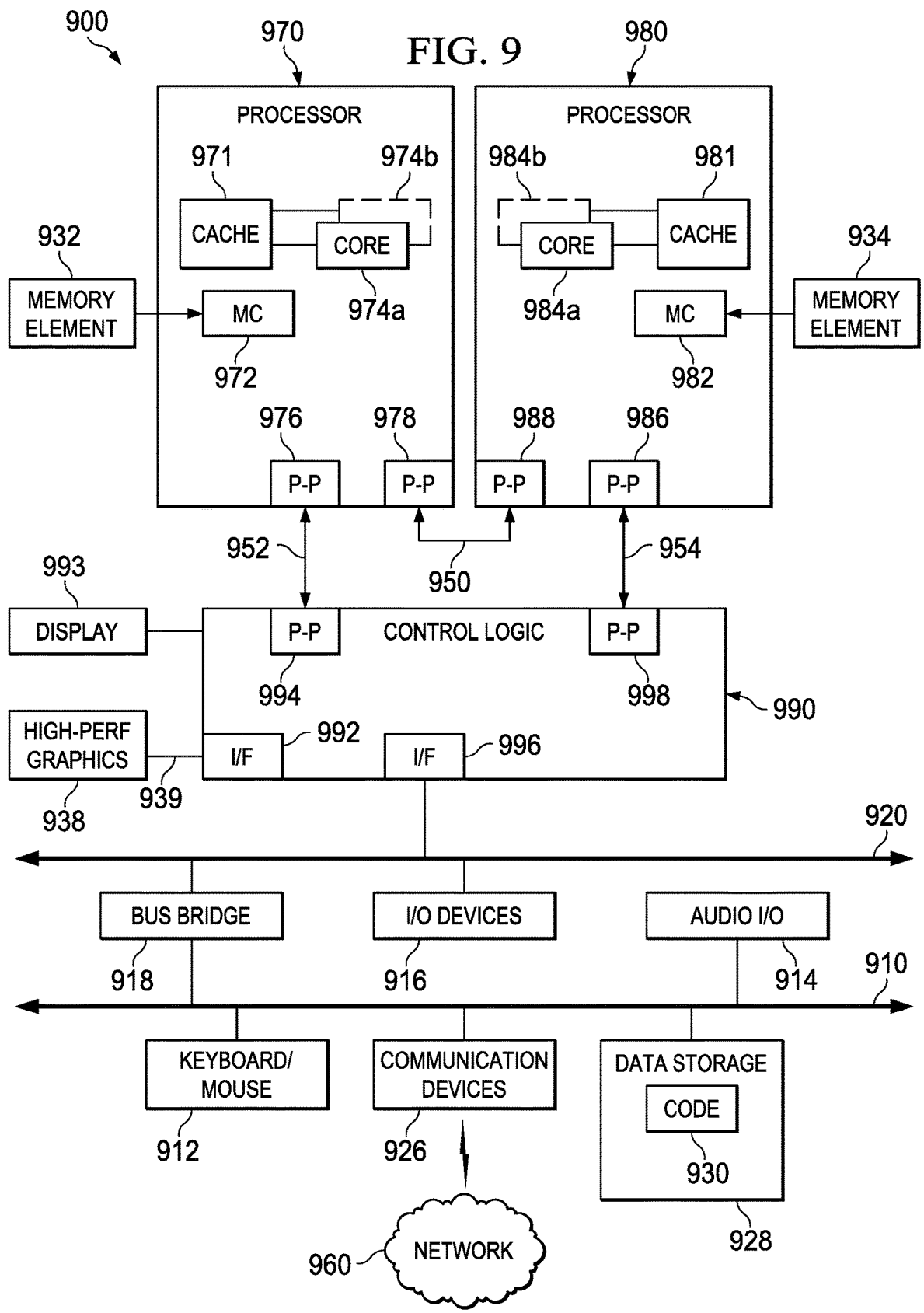
FIG. 9 is a block diagram of an example computing system that is arranged in a point-to-point (PtP) configuration according to at least one embodiment.

FIG. 9 illustrates one possible example of a computing system 900 that is arranged in a point-to-point (PtP) configuration according to an embodiment. In particular, FIG. 9 shows a system where processors, memory, and input/output devices are interconnected by a number of point-to-point interfaces. In at least one embodiment, endpoints 30(1)-30(N) and/or backend system 20, shown and described herein, may be configured in the same or similar manner as exemplary computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations associated with remote endpoint information retrieval, as outlined herein.

Processors 970 and 980 may be any type of processor, such as those discussed with reference to processor 800 of FIG. 8, and processors 39(1)-39(N) of FIG. 1. Processors 970 and 980 may exchange data via a point-to-point (PtP) interface 950 using point-to-point interface circuits 978 and 988, respectively. Processors 970 and 980 may each exchange data with control logic 990 via individual point-to-point interfaces 952 and 954 using point-to-point interface circuits 976, 986, 994, and 998. As shown herein, control logic 990 is separated from processing elements 970 and 980. However, in an embodiment, control logic 990 is integrated on the same chip as processing elements 970 and 980. Also, control logic 990 may be partitioned differently with fewer or more integrated circuits. Additionally, control logic 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Control logic 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, joystick, etc.), communication devices 926 (such as modems, network interface cards, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computing system depicted in FIG. 9 is a schematic illustration of an embodiment that may be utilized to implement various embodiments discussed herein. It will be appreciated that various components of the system depicted in FIG. 9 may be combined in a system-on-a-chip (SoC) architecture or in any other suitable configuration capable of achieving the protection of private data, according to the various embodiments provided herein.

Figure 10:
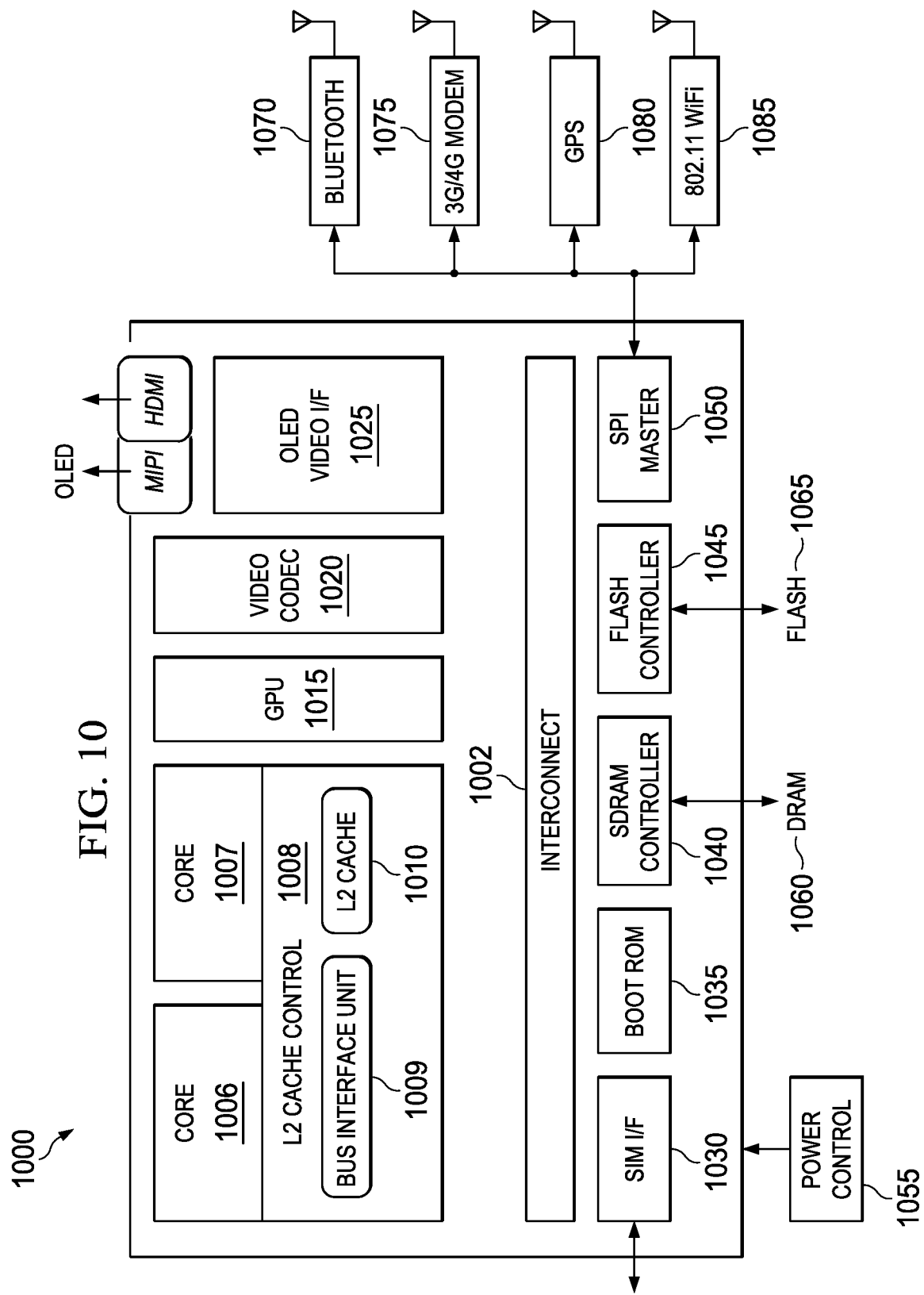
FIG. 10 is a simplified block diagram associated with an example ARM ecosystem system on chip (SOC) according to at least one embodiment.

Turning to FIG. 10, FIG. 10 is a simplified block diagram associated with an example ARM ecosystem SOC 1000 of the present disclosure. At least one example implementation of the present disclosure can include the remote endpoint information retrieval features discussed herein and an ARM component. For example, the example of FIG. 10 can be associated with endpoints 30(1)-30(N). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and a liquid crystal display (LCD) I/F 1025, which may be associated with mobile industry processor interface (MIPI)/high-definition multimedia interface (HDMI) links that couple to an LCD.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more embodiments include one or more communication capabilities, interfaces, and features such as instances of Bluetooth™ 1070, a 3G/4G/nG modem 1075, a global positioning system (GPS) 1080, and 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Regarding the internal structure associated with endpoints 30(1)-30(N) and backend system 20, these devices can include volatile and/or nonvolatile memory elements (e.g., memory elements 37(1)-37(N), etc.) for storing data and information, including instructions, logic, and/or code, to be used in the operations outlined herein. Endpoints 30(1)-30(N) and backend system 20 may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine readable media that are capable of storing data and information), software, hardware, firmware, or in any other suitable component, device, element, or object where appropriate and based on particular needs. Any of the memory items discussed herein (e.g., memory elements 37(1)-37(N)) should be construed as being encompassed within the broad term 'memory element.' Moreover, the information being used, stored, tracked, sent, or received in communication system 100 could be provided in any storage structure including, but not limited to, a repository, database, register, queue, table, or cache, all of which could be referenced at any suitable timeframe. Any such storage structures (e.g., collected data database, etc.) may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by one or more processors, or other similar machines, etc.), which may be inclusive of non-transitory machine readable storage media. Endpoints 30(1)-30(N) and backend system 20 may include one or more processors (e.g., processors 39(1)-39(N)) that can execute logic or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Note that with the examples provided herein, interaction may be described in terms of two, three, or more computing systems. However, this has been done for purposes of clarity and example only. In certain cases, it may be easier to describe one or more of the functionalities of a given set of flows by only referencing a limited number of endpoints and backend systems. Moreover, the system for remote endpoint information retrieval is readily scalable and can be implemented across a large number of components, as well as more complicated/sophisticated arrangements and configurations. Accordingly, the examples provided should not limit the scope or inhibit the broad teachings of the private data protection system as potentially applied to a myriad of other architectures.

It is also important to note that the operations described with reference to FIGS. 1-7, illustrate only some of the possible remote endpoint information retrieval activities that may be executed by, or within, communication system 100. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

As used herein, unless expressly stated to the contrary, use of the phrase 'at least one of' preceding multiple items (e.g., elements, conditions, activities, etc.) is intended to mean any combination of the named items. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the endpoint information retrieval activities, these elements and operations may be replaced by any suitable architecture, protocols, and/or processes that achieve the intended functionality of the system for remote endpoint information retrieval.

OTHER NOTES AND EXAMPLES

The following examples pertain to embodiments in accordance with this specification. Example 1 provides an apparatus, a system, one or more machine readable storage mediums, a method, and/or hardware-, firmware-, and/or software-based logic to: receive a master query at an endpoint in a network environment; execute a set of one or more subqueries defined in the master query. In Example 1, an execution of a first subquery of the set of one or more subqueries is to include: causing a function to execute on the endpoint to produce a first output; applying one or more conditions to the first output to determine a first result; and determining a result of the master query based, at least in part, on the first result.

In Example 2, the subject matter of Example 1 can optionally include the master query being received from another node over a network connection.

In Example 3, the subject matter of any one of Examples 1-2 can optionally include the function being executed on the endpoint to collect real-time information based on one or more parameters.

In Example 4, the subject matter of any one of Examples 1-3 can optionally include the function being one of a plug-in or a script.

In Example 5, the subject matter of any one of Examples 1-4 can optionally include the applying the one or more conditions to the first output including filtering the first output to determine the first result.

In Example 6, the subject matter of any one of Examples 1-5 can optionally include the instructions, when executed by the at least one processor, causing the at least one processor to determine a type of action indicated in the master query, and to generate the set of one or more subqueries to be executed based, at least in part, on the type of action.

In Example 7, the subject matter of Example 6 can optionally include the type of action being one of a search, a trigger, or a response.

In Example 8, the subject matter of any one of Examples 1-7 can optionally include the instructions, when executed by the at least one processor, causing the at least one processor to execute a second function on the endpoint if the master query result indicates the endpoint is compromised.

In Example 9, the subject matter of any one of Examples 1-7 can optionally include an execution of a second subquery of the set of one or more subqueries, the execution to include: causing a second function to execute on the endpoint to produce a second output; and applying one or more other conditions to the second output to determine a second result, where the result of the master query is determined, at least in part, by evaluating the first and second results according to a logical operator.

In Example 10, the subject matter of Example 9 can optionally include the function and the second function to perform different operations on the endpoint.

In Example 11, the subject matter of any one of Examples 1-10 can optionally include the applying the one or more conditions to the first output including: applying a first condition to the first output to determine a first condition result; applying a second condition to the first output to determine a second condition result; and determining a condition chain result based, at least in part, on the first condition result, the second condition result and a condition operator.

In Example 12, the subject matter of any one of Examples 1-11 can optionally include the first result including at least one string of information returned from the function.

In Example 13, the subject matter of Example 12 can optionally include the first result being filtered to exclude at least some information from the string of information.

In Example 14, the subject matter of any one of Examples 1-13 can optionally include the result of the master query being communicated to a query service in another node.

In Example 15, the subject matter of any one of Examples 1-14 can optionally include the master query comprising: a plurality of query chains including a first query chain, the first query chain including the set of one or more subqueries; and a query chain operator, where the master query result is determined using the query chain operator to evaluate query chain results of the plurality query chains.

Example 16 provides an apparatus for retrieving information on an endpoint, the apparatus comprising means for performing the method of any one of Examples 1-15.

In Example 17, the subject matter of Example 16 can optionally include the means for performing the method comprising at least one processor and at least one memory element.

In Example 18, the subject matter of Example 17 can optionally include the at least one memory element comprising machine readable instructions that when executed, cause the apparatus to perform the method of any one of Examples 1-15.

In Example 19, the subject matter of any one of Examples 16-18 can optionally include the apparatus being one of computing system or a system-on-a-chip.

Example 20 provides at least one machine readable storage medium comprising instructions for retrieving information on an endpoint, where the instructions when executed realize an apparatus or implement a method as in any one of Examples 1-15.

What is claimed is:

1. At least one machine readable storage medium comprising instructions that, when executed by a processor, cause the processor to:
   receive a master query, by a query engine in an endpoint in a network, from a query service in another node via a network connection;
   parse, by the query engine in the endpoint, the master query into code to be executed;
   determine a type of action requested in the master query;
   generate, by the query engine in the endpoint, a query chain to executed, wherein the query chain includes one or more subqueries;
   execute, by the query engine in the endpoint, the query chain;
   generate, by the query engine in the endpoint, a master query result based on the executed query chain;
   cause, responsive to the master query result indicating a condition is met, a script to be executed by the endpoint to perform an action on the endpoint; and
   communicate, by the query engine in the endpoint, the master query results to the query service.

2. The at least one machine readable storage medium according to claim 1, wherein the query chain is a plurality of query chains, and wherein the plurality of query chains are executed sequentially.

3. The at least one machine readable storage medium according to claim 1, wherein the query chain is a plurality of query chains, and wherein the plurality of query chains are executed in parallel.

4. The at least one machine readable storage medium according to claim 1, wherein the query chain is a plurality of query chains, and wherein the master query result is generated when each of the plurality of the query chains has returned a query chain result.

5. The at least one machine readable storage medium according to claim 1, wherein the query chain uses short circuit logic.

6. The at least one machine readable storage medium according to claim 5, wherein the query chain is a plurality of query chains, and wherein the master query result is generated when a successful query chain result is returned.

7. The at least one machine readable storage medium according to claim 1, wherein the action performed on the endpoint includes deleting a file, quarantining a file, sending an email, sending a notification, killing a process, rebooting the endpoint, or shutting down the endpoint.

8. An apparatus, the apparatus being an endpoint in a network and comprising:
   a processor; and
   a memory storing executable instructions that when executed by the processor cause the processor to:
      receive, by a query engine in an endpoint, a master query from a query service in another node via a network connection;
      parse, by the query engine in the endpoint, the master query into code to be executed;
      determine, by the query engine in the endpoint, a type of action requested in the master query;
      generate, by the query engine in the endpoint, one or more query chains to be executed, wherein the one or more query chains include one or more subqueries;
      execute, by the query engine in the endpoint, the one or more query chains;
      generate, by the query engine in the endpoint, a master query result based on the executed one or more query chains;

cause, responsive to the master query result indicating a condition is met, a script to be executed by the endpoint to perform an action on the endpoint; and communicate, by the query engine in the endpoint, the master query result to the query service.

9. The apparatus of claim 8, wherein the one or more query chains are executed sequentially.

10. The apparatus of claim 8, wherein the one or more query chains are executed in parallel.

11. The apparatus of claim 8, wherein the master query result is generated when each of the one or more query chains has returned a query chain result.

12. The apparatus of claim 8, wherein the one or more query chains use short circuit logic.

13. The apparatus of claim 12, wherein the master query result is generated when a successful query chain result is returned by the one or more query chains.

14. The apparatus of claim 8,
wherein the action performed on the endpoint includes deleting a file, quarantining a file, sending an email, sending a notification, killing a process, rebooting the endpoint, or shutting down the endpoint.

15. A method, comprising:
receiving a master query, by a query engine in an endpoint in a network, from a query service in another node via a network connection;

parsing, by the query engine in the endpoint, the master query into code to be executed;

determining, by the query engine in the endpoint, a type of action requested in the master query;

generating, by the query engine in the endpoint, one or more query chains to be executed, wherein the one or more query chains include one or more subqueries;

executing, by query engine in the endpoint, the one or more query chains;

generating, by the query engine in the endpoint, a master query result based on the executed one or more query chains;

causing, responsive to the master query result indicating a condition is met, a script to to be executed by the endpoint to perform an action on the endpoint; and communicating, by the query engine in the endpoint, the master query result to the query service.

16. The method of claim 15, wherein the one or more query chains are executed sequentially.

17. The method of claim 15, wherein the one or more query chains are executed in parallel.

18. The method of claim 15, wherein the master query result is generated when each of the one or more query chains has returned a query chain result.

19. The method of claim 15, wherein the one or more query chains use short circuit logic, and wherein the master query result is generated when a successful query chain result is returned by the one or more query chains.

20. The method of claim 15,
wherein the action performed on the endpoint includes deleting a file, quarantining a file, sending an email, sending a notification, killing a process, rebooting the endpoint, or shutting down the endpoint.

* * * * *

UNITED STATES PATENT AND TRADEMARK OFFICE
CERTIFICATE OF CORRECTION

PATENT NO. : 11,429,625 B2
APPLICATION NO. : 16/813547
DATED : August 30, 2022
INVENTOR(S) : Leandro Ignacio Costantino et al.

It is certified that error appears in the above-identified patent and that said Letters Patent is hereby corrected as shown below:

In the Claims

In Column 26, Claim 1, Line 12, delete "to" and insert -- to be --, therefor.

In Column 26, Claim 1, Line 22, delete "results" and insert -- result --, therefor.

In Column 28, Claim 15, Line 10, delete "to to" and insert -- to --, therefor.

Signed and Sealed this
Third Day of January, 2023

Katherine Kelly Vidal
Director of the United States Patent and Trademark Office